C. W. SHERBURNE.

RAILWAY TRACK SANDING APPARATUS.

No. 11,424. Reissued July 3, 1894.

WITNESSES
J. M. Dolan
J. W. Cummings

INVENTOR
Charles W. Sherburne
by his Attys
Clarke & Raymond

UNITED STATES PATENT OFFICE.

CHARLES W. SHERBURNE, OF BOSTON, MASSACHUSETTS, ASSIGNOR TO THE AUTOMATIC TRACK SANDING COMPANY, OF PORTLAND, MAINE.

RAILWAY-TRACK-SANDING APPARATUS.

SPECIFICATION forming part of Reissued Letters Patent No. 11,424, dated July 3, 1894.

Original No. 481,595, dated August 30, 1892. Application for reissue filed January 15, 1894. Serial No. 497,117.

*To all whom it may concern:*

Be it known that I, CHARLES W. SHERBURNE, a citizen of the United States, residing at Boston, in the county of Suffolk and State of Massachusetts, have invented a new and useful Improvement in Railway-Track-Sanding Apparatus, of which the following is a full, clear, and exact description, reference being had to the accompanying drawings, sufficient to enable others skilled in the art to make and use my invention.

Figure 2:
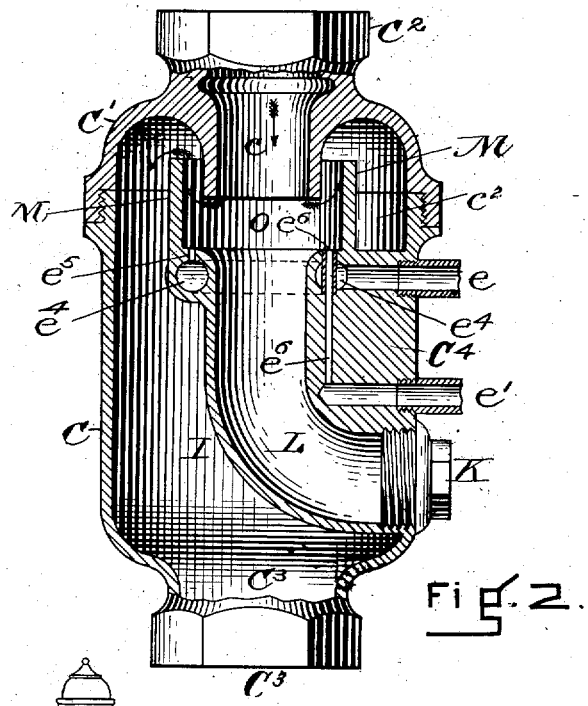
Figure 1:
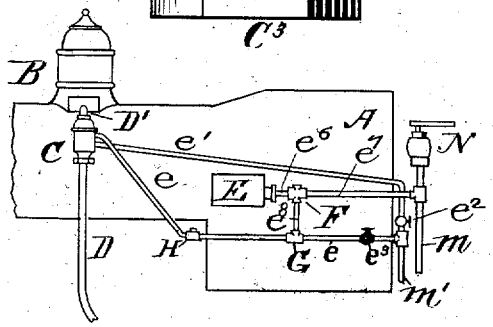

In the drawings, Figure 1 is a longitudinal vertical section of the part of the instrument which governs and regulates the delivery of the sand, and Fig. 2 illustrates the manner in which it is combined with the air-brake apparatus of a train-brake.

One principal object of this apparatus is to provide a means for furnishing to the sanding tube supplies of sand in different quantities and at the will of the engineer; and another principal object is to have the apparatus work automatically and deliver sand in quantity upon the track when the train-brake is applied.

The well-known construction of the modern Westinghouse air-brake provides for the application of the brakes by the turning of a valve on the engine. Each vehicle to be braked has an independent reservoir supplied from the air-pump on the engine, into which the compressed air is conducted from an air-pipe which runs the whole length of the train, the connection of which with the reservoir on the car is governed by an instrument called the "triple valve," and there is connected with this train-brake apparatus another valve called the "signal-valve," which operates on very much the same principle as the triple valve.

There are two forms of signal-valve in use in the Westinghouse apparatus, and one of them, called the "old pattern of signal-valve," is better adapted to the use to which I propose to put it than the newer pattern, called a "signal-valve," although both of them would probably serve the intended purpose. By the combination of the reservoir on the car and the air-pump connected with the engine with the triple valve and the braking-cylinder so long as the air-pressure in the reservoir under the car is equal to the pressure in the train-line no braking is done; but when the engineer on the engine turns what is known as the "engineer's valve," which is connected with the air-pipe leading from the engine toward the train, the pressure of air in the train-line is reduced and the pressure of air in the local reservoir allows the triple valve or signal-valve to open, and the reservoir is by the opening of this triple valve connected with the brake-cylinder, or the reservoir connected with the signal-valve is open to the alarm-whistle. Nothing of this apparatus is of my invention; but I propose to employ an apparatus on this principle to actuate a track sanding apparatus automatically on the opening of the engineer's valve. In order that this may be understood, A of Fig. 2 is the boiler of a locomotive. B in the same figure is the sand-box. C of the same figure is the sand-controlling barrel, and D is the pipe leading from the sand controlling barrel in front of the wheels.

E is an air-reservoir connected by the air-pipe $e^6$ with the triple or signal valve F. $e^7$ is the pipe which connects this triple or signal valve with the train-line, and $e^8$ is the pipe which connects the triple or signal-valve with the T G.

$e$ is an air-pipe connected with the sand distributing barrel C at one end and with the air-brake apparatus at the other, and having in it the T G, already referred to, and the T H which serves to connect it with a similar pipe on the opposite side of the apparatus. This pipe may be controlled at the will of the engineer by the cock $e^3$.

$e'$ is another pipe leading from the air-pipe $m'$ to the sand-distributing barrel C, and this is controlled by the engineer by the cock $e^2$. A branch of this pipe (not shown) also goes to the sand-controlling barrel on the opposite side of the engine. This pipe $e'$ is controlled by a cock $e^2$ within the reach of the engineer. The pipes $m$ $m'$ serve to connect these pipes $e$ and $e'$ with the air-supply passing through the train-line. The pipe $m$ is the usual pipe connected with the train-line and surmounted by the engineer's valve N. The pipe $m'$ is not connected with the train line itself, but with the reservoir which supplies the train line.

It is obvious, therefore, that when the engineer's valve is opened and the air-pressure in the train-line and in the pipe *m* is lowered the automatically-acting valve F will be caused to act and an air-supply will be sent from the reservoir E through pipes $e^6$ $e^8$, and *e* to the sand-distributing apparatus C, and thereby the turning of the engineer's valve N will cause a supply of air under pressure to be furnished to the sand-distributing barrel C of this apparatus, and this apparatus is therefore put in combination with the air-brake apparatus of the Westinghouse system, so as to act automatically when the air-brake apparatus is operated.

In stopping a train by its brakes the wheels of a train or at least some of them are very apt to "skid," as it is called, or slide upon the tracks; but if the tracks are sanded when the brakes are applied they will continue to revolve, and the revolution of the wheel is essential in a speedy stoppage of the train. It is therefore important that the track should be sanded in connection with the application of the brakes; but there are too many handles already in a locomotive-cab, for the attention of the engineer, and he could not well be asked to put the sanding apparatus in operation independently. If desired, of course, any of the cars could be furnished with a sanding apparatus to deliver sand in front of the wheels, and this could be operated from the reservoir and triple valve on the car itself.

Turning now to the particular form of apparatus employed for this purpose, which is shown in Fig. 1, C is the shell of the barrel, C′ is its cap, and $C^2$ is the neck of the cap, by which it is connected with the pipe D′ of Fig. 2, leading from the sand-box B. $C^3$ is the lower neck of the apparatus, by which it is connected with the pipe D, leading to the front of the wheel. The neck $C^2$ is hollow, and this hollow of the neck is continued into the channel *c*. On the inside of the barrel C is a wall I, which connects with the boss $C^4$ and in connection with that boss forms a curved channel, lettered L. This curved channel is stopped at its lower end by the screw-plug K. By removing this screw-plug K the sand in the channel L can be cleared out. Around the top of the channel L is located a circular air-channel $e^4$, which circular air-channel $e^4$ is perforated with more or less holes $e^5$ only one of which is shown. The air-channel $e^4$ is connected with the air-pipe *e*, which is the pipe leading to the train-line and through which, also, sand in considerable quantities can be projected by opening the cock $e^3$. The other air-pipe *e′* enters a hole in the boss $C^4$, which connects with a small vertical channel $e^6$, leading to a pipe which traverses the circular air-pipe $e^4$ from bottom to top and opens in the port $e^6$. A wall M M surrounds the pipe projected downward from the neck $C^2$, and may be slightly higher than the bottom of this pipe. The basin within this wall is lettered O. Sand descending from the sand-box will pass through the pipe *c* into the basin O and into the channel L, filling this latter and banking up within the chamber O. If now a moderate supply of sand be wanted the air-pressure is admitted in the pipe *e′* by opening the cock $e^3$, and the air will pass through the air-pipe *e′* and the channel and issue at port $e^6$, blowing the sand upward over the wall M, and thence down through the annular or nearly annular channel $c^2$ to the lower part of the barrel $c^3$, and thence out through the neck $C^3$. Only a moderate supply of sand can be furnished by this means. If, however, a larger supply of sand is needed a larger supply of air can be furnished to the chamber O at different points in the circumference by admitting air through the air-pipe *e*, which will then enter the annular channel $e^4$ and be delivered to the chamber O at different points around its lower circumference, and thus blow out a ring of sand which will pass over the wall M and be sent forward and blown downward to the front of the wheels. If the train-brake is applied in the usual way by turning the engineer's valve, the apparatus will then work automatically in connection with the air-braking apparatus through the combination of the reservoir E, the automatic valve F, and the pipe *e*.

It is believed that no arrangement has hitherto been made for combining with a track sanding apparatus, actuated by compressed-air, two independent supplies of air, one furnishing to the sand a very small quantity of air in one place and the other a much larger quantity in several places; and it is also believed that no attempt has hitherto been made to combine an air-actuated sanding apparatus with the air-brake apparatus, so as to be called into action automatically on the turning of the engineer's valve, and it is also believed that the construction of the sand-distributing barrel is in many respects novel.

It is obvious that the reservoir E and automatic valve F can be placed on either side of the engine or other vehicle. It is not necessary to have an independent reservoir E, as the main reservoir can be used, if desired. The blast of air supplied to the sand-regulating barrel will be exactly proportioned to the strength with which the brakes are applied. If the train should break apart, sand would be supplied automatically without the intervention of the engineer.

The expense and danger of "skidded" or sliding wheels will be very much alleviated, if not entirely checked, by use of this apparatus.

As before observed, the apparatus can be applied to a vehicle in any part of the train, and in long trains and particularly in freight-trains furnished with air brakes it will be desirable to have one automatic sanding apparatus at or near the head of the train, so that sand shall be applied in several places to the track.

I have referred to the valve which is to govern the automatic supply of air as a "triple" or "signal" valve and also as an "automatic" valve. The descriptive words "triple" or "signal" valve indicate the construction which it is desirable to follow, either of which constructions is suitable for the purpose, when desired but in order to include other valves of similar construction which may be mechanical equivalents thereof and to include both of said forms in one word which implies the quality desired I have called them by the single word "automatic" valves.

I claim as my invention and desire to secure by Letters Patent of the United States—

1. In a track-sanding apparatus, the combination, with the sand-supplying apparatus, of two independent conduits for compressed air, both under control of the engineer, one of them being the pipe *e* and the other being the pipe *e'*, the pipe *e'* furnishing only a small quantity of air to propel the sand, the other pipe *e* furnishing a much larger quantity of air to propel the sand, substantially as and for the purposes described.

2. In a track-sanding apparatus, the combination, with the train-line and engineer's valve, of the reservoir E, the automatic valve F, air-pipe *e*, and sand-distributing barrel C, substantially as and for the purposes described.

3. The combination of the Westinghouse air-brake apparatus having an automatic valve and its air-reservoir, with an air-actuated sand-distributing barrel and sand-delivery pipe, substantially as described.

4. In a track-sanding apparatus, the combination of a sand-chamber O, a wall M, surrounding said basin, a sand-delivery channel *c*, and two air-pipes, one of which furnishes a very much larger quantity of air than the other, substantially as and for the purposes described.

5. The combination, with a railway-train and with the vehicles thereof and with the air-brake apparatus of such a train, of two or more sets of automatic track-sanding apparatus actuated by compressed air of the air-brake apparatus, one of which automatic track-sanding apparatus is located on a vehicle at or near the head of the train and the other one on a vehicle behind the vehicle at or near the head of the train which carries the track-sanding apparatus hereinbefore referred to, substantially as and for the purposes described.

6. The combination of a compressed air-reservoir and a track sanding apparatus with an air pipe, which connects the track sanding apparatus with the air-reservoir, and a valve which governs the flow of air through said pipe, and opens or closes the communication between the reservoir of compressed air and the track sanding apparatus, and in further combination with the handle of the engineer's valve, whereby by turning the handle of the engineer's valve, the said pipe leading from the air reservoir to the track sanding apparatus is automatically opened from the air reservoir to the track sanding apparatus, or cut off from connecting the air-reservoir with the track sanding apparatus by turning the handle of the engineer's valve, substantially as and for the purpose described.

7. The combination of a track sanding apparatus, a reservoir of compressed air, a pipe which connects said reservoir of compressed air with the track sanding apparatus, and interrupted in the course of its length by an automatic shut-off valve, an automatic shut-off valve in said pipe, a pipe leading from said automatic valve to the apparatus for controlling the pressure in the train line, and a handle under control of the engineer, which actuates through the air column said automatic valve, substantially as and for the purpose described.

8. In a track sanding apparatus, the combination of the sand box B, and its devices for controlling the delivery of sand through the pipes D, the sand delivery pipes D, the air pressure pipes *e*, which connect the air pressure reservoir E with the track sanding apparatus proper, the valve F which controls the passage of air from the reservoir E to and through the pipe *e*, the pipe *m*, which connects with the train line and with the pipe $e^7$, the pipe $e^7$ which supplies the air-reservoir E, and through which the reduced pressure of the train line automatically shifts the valve F, and cuts off the reservoir E from the train line, all controlled and operated by the handle of the engineer's valve N, substantially as and for the purpose described.

9. The combination with a locomotive of compressed air conductors, a sand box B having outlet tubes for the sand, a pipe for conducting compressed air to the sand delivery device, an auxiliary compressed air receptacle E, a pipe for connecting said auxiliary compressed air receptacle with the main conductors of compressed air, and a valve for automatically connecting the auxiliary receptacle of compressed air with the pipe which conveys compressed air to the sand box, substantially as set forth.

CHARLES W. SHERBURNE.

Witnesses:

THOS. WM. CLARKE,

J. M. DOLAN.